United States Patent [19]
Bloomberg

[11] Patent Number: 5,434,953
[45] Date of Patent: Jul. 18, 1995

[54] USE OF FAST TEXTURED REDUCTION FOR DISCRIMINATION OF DOCUMENT IMAGE COMPONENTS

[75] Inventor: Dan S. Bloomberg, Palo Alto, Calif.

[73] Assignee: Xerox Corporation

[21] Appl. No.: 854,156

[22] Filed: Mar. 20, 1992

[51] Int. Cl.⁶ .............................................. G06K 9/42
[52] U.S. Cl. .................................... 395/139; 382/298; 358/451
[58] Field of Search ................ 395/155, 161, 139, 157; 382/47; 358/451

[56] References Cited

U.S. PATENT DOCUMENTS

| | | | |
|---|---|---|---|
| 4,893,333 | 1/1990 | Baran et al. | 379/100 |
| 4,933,979 | 6/1990 | Suzuki et al. | 382/61 |
| 5,048,109 | 9/1991 | Bloomberg et al. | 382/50 |
| 5,065,437 | 11/1991 | Bloomberg | 382/9 |
| 5,129,014 | 7/1992 | Bloomberg | 382/48 |
| 5,131,049 | 7/1992 | Bloomberg et al. | 382/9 |
| 5,138,672 | 8/1992 | Hirabayashi et al. | 382/47 X |
| 5,294,998 | 3/1994 | Provoso et al. | 382/47 X |
| 5,335,295 | 8/1994 | Ferracini et al. | 382/47 |
| 5,335,296 | 8/1994 | Larkin et al. | 382/47 |

FOREIGN PATENT DOCUMENTS

| | | |
|---|---|---|
| 0392701 | 10/1990 | European Pat. Off. . |
| 398185A2 | 11/1990 | European Pat. Off. . |
| 431961A2 | 6/1991 | European Pat. Off. . |
| 0431961 | 12/1991 | European Pat. Off. . |
| 62-272751 | 11/1987 | Japan . |
| 63-95578 | 4/1988 | Japan . |
| 63-242060 | 10/1988 | Japan . |
| 2160057 | 12/1985 | United Kingdom . |

OTHER PUBLICATIONS

Paul S. Heckbert, "A Seed Fill Algorithm," *Graphics Gems,* edited by Andrew S. Glassner, pp. 275–277 and 721–722 (Academic Press).
K. Y. Wong et al., "Document Analysis System," *IBM J. Res. Development,* vol. 26, No. 6, Nov. 1982.
Stanley R. Sternberg, "Biomedical Image Processing," *IEEE,* Jan. 1983.
Petros Maragos, "Tutorial on Advances in Morphological Image Processing and Analysis," *Optical Engineering,* vol. 26, No. 7, Jul. 1987.
Robert M. Haralick et al., "Image Analysis Using Mathematical Morphology," *IEEE,* vol. PAM1-9, No. 4, Jul. 1987.

*Primary Examiner*—Heather R. Herndon
*Assistant Examiner*—Cliff N. Vo
*Attorney, Agent, or Firm*—Townsend and Towsend Khourie and Crew

[57] ABSTRACT

A technique for reducing images that provides useful information about the image and allows fast computation. Using threshold values near the extreme possible values for the convolution window size and using large subsampling tiles nevertheless allows extraction of the information about the typical textures that exist in the document image: text words, text lines, rules, and halftones. In a particular embodiment, 16×16 tiles are used for subsampling, 16×1 and 1×16 windows are used for the convolution, and threshold values of 1 and 16 are used. If the horizontal windows in tiles are aligned with 16-bit boundaries in the computer, the implementation is particularly efficient. For the 16×1 horizontal window, a threshold convolution with T=1 can be done on any of the sixteen 16-bit words in the tile by checking whether the word is zero or non-zero. For a 1×16 vertical window, a threshold convolution with T=1 can be done on any of the sixteen 16-bit columns in the tile by ORing the sixteen appropriately masked words.

19 Claims, 10 Drawing Sheets

USE OF FAST TEXTURED REDUCTION FOR DISCRIMINATION OF DOCUMENT IMAGE COMPONENTS

BACKGROUND OF THE INVENTION

The present invention relates generally to computerized image processing and more specifically to techniques for rapidly characterizing document images.

The rapid determination of image and graphic regions within document images is important in a number of contexts, such as rendering scanned images on paper. For example, halftone regions must be treated differently from text. The best results for halftones result when the regions are descreened (binarized) for output, while the best results for text/line-graphics result from a binarization of the input image that leaves edges sharp. The results of treating one type of region as if it were the other can be disastrous.

Similarly, in reconstructing documents, halftone regions must neither be converted to connected components (expensive in time and memory) nor be sent to an OCR system for "recognition." If there are no halftones, then the page can be analyzed without concern for the problems presented by halftones. If there are, more careful segmentation methods can be used to avoid expensive and inappropriate operations on the halftones. Further, if there are halftones and if the halftone regions are identified, segmentation and OCR processing on the remaining parts of the image (text/line-graphics) can proceed.

Direct, rapid location of text line regions and rules is also useful for the segmentation process, where the layout of the image (in terms of regions of text, line graphics, rules, and halftone) is determined. Location of rules and text columns also helps in the subsequent process of building a logical description of the image.

Rapid characterization is also important for forms analysis. Determining the location of lines has been shown to be effective for form classification. For form interpretation, it can be useful to locate finely textured regions, which can be digital data or registration marks.

Thresholded reduction, described in copending patent application Ser. No. 449,627 filed Dec. 8, 1989, titled "IMAGE REDUCTION/ENLARGEMENT TECHNIQUE," the disclosure of which is hereby incorporated by reference, uses a rank order filter (threshold convolution) followed by subsampling, where the kernel of the convolution is a square of 1's of the same size as the tiles used for subsampling. The cases where the tiles were $2\times2$, $3\times3$, and $4\times4$ are described. Optimizations for the $2\times2$ case include the combination of logical operations and reduction to eliminate rank-order computation on pixels that were not subsampled, the use of lookup tables, and special hardware implementations.

A threshold convolution over a large window (or convolution kernel) is, in general, very expensive on a large image. The convolution requires arithmetic on each pixel; the threshold requires a test. $2\times2$ reductions (tile size $2\times2$) were used for ease of implementation and for finding an efficient implementation that spanned the range of threshold values (in that case, the relatively small range from 1 to 4). Intermediate threshold values of 2 and 3 were about twice as expensive to compute as for values 1 and 4, but this is not a serious computational burden.

The special features of the $2\times2$ threshold reduction are that row operations can be done by logic, 32 pixels at a time, and column operations can be carried out with lookup tables, at, for example, 16 bits per lookup. Arithmetic on individual pixels is not required. There remains, however, the question of how to do threshold convolution cheaply, with logic and not arithmetic, over a large window.

SUMMARY OF THE INVENTION

The present invention is drawn to an image reduction technique that quickly provides useful information about the image.

Normally, the usefulness of the information extracted must be traded off against computation speed. Surprisingly, however, it has been found that using threshold values near the extremes of possible values for the convolution window (1 and the size of the window) and large subsampling tiles allows rapid extraction of the information about the typical textures that exist in the image: text words, text lines, rules, and halftones.

The convolution window is defined by a set of W pixel positions referred to a particular position. For any point (pixel) in the image, a convolution can be performed at this point by laying the window over the image, referenced to this point, and summing the ON pixels within the window. A threshold of 1 is equivalent to asking if any of the pixels within the window is ON. A threshold of W (the window size) is equivalent to asking if all the pixels within the window are ON. If the window corresponds to a word in the computer, both questions can be answered with simple logic alone. The former is equivalent to asking if the word is non-zero, the latter is equivalent to asking if the bit-inverse of the word is non-zero. A full convolution would require performing this evaluation for each point. However, the present invention performs the evaluation at only one point in each subsampling tile.

In particular embodiments, $16\times16$ tiles are used for subsampling, $16\times1$ vertical and $1\times16$ horizontal windows are used for the convolution, and threshold values of 1 and 16 are used. If the horizontal windows in tiles are aligned with 16-bit boundaries in the computer, the implementation is particularly efficient. For the $1\times16$ horizontal window, a threshold convolution with $T=1$ can be done on any of the sixteen 16-bit words in the tile by checking whether the word is zero or non-zero. For a $16\times1$ vertical window, a threshold convolution with $T=1$ can be done on any of the sixteen 16-bit columns in the tile by ORing the 16 appropriately masked words. This is about 16 times more expensive than for the horizontal window.

A further understanding of the nature and advantages of the present invention may be realized by reference to the remaining portions of the specification and the drawings.

BRIEF DESCRIPTION OF THE DRAWINGS

FIGS. 7B–7D show the original image and the image at various stages in the method.

DESCRIPTION OF SPECIFIC EMBODIMENTS

Definitions and Terminology

Figure 1:
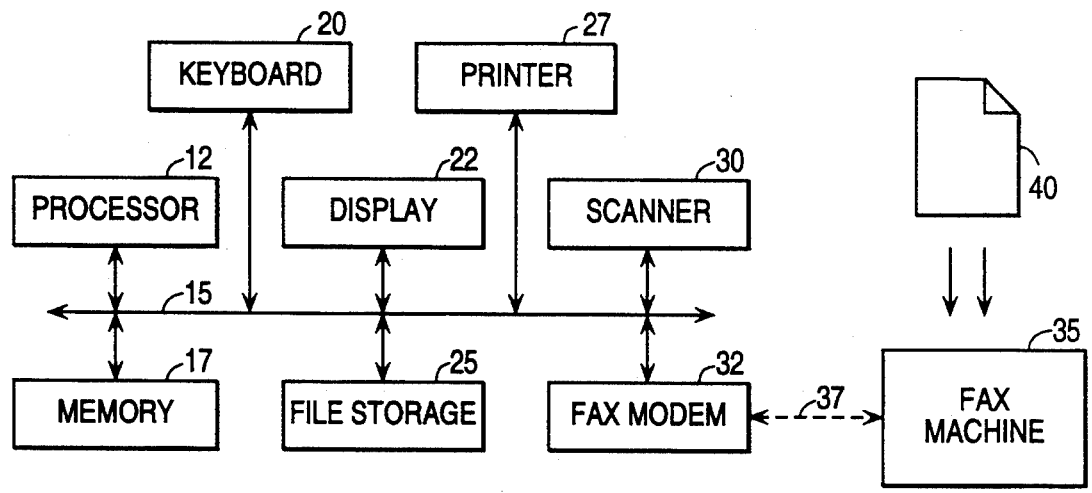
FIG. 1 is a block diagram of a computer system within which the present invention may be embodied.

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having substantial run length as compared to text. Graphics could range from, for example, horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an $N \times N$ square of pixels, all having the same value as the original pixel.

"Reduction" is a scale operation characterized by a SCALE factor N and a threshold level T. Reduction with SCALE=N entails dividing the source image into $N \times N$ squares of pixels, mapping each such square in the source image to a single pixel on the destination image. The value for the pixel in the destination image is determined by the threshold level T, which is a number between 1 and $N^2$. If the number of ON pixels in the pixel square is greater or equal to T, the destination pixel is ON, otherwise it is OFF.

"Subsampling" is an operation wherein the source image is subdivided into smaller (typically square) elements, and each element in the source image is mapped to a single pixel in the destination image. The destination pixel value is defined by a selected pixel in the source image element. The selection may be predetermined (e.g., upper left pixel) or random.

A "4-connected region" (or "4-connected component") is a set of ON pixels wherein any two pixels in the set can be joined by a path that includes the two pixels and includes only pixels in the set, and each pixel on the path is laterally or vertically adjacent to at least one other pixel on the path. An isolated ON pixel that has no 4-connected neighbors may as a matter of definition be considered a 4-connected region.

An "8-connected region" (or "8-connected component") is a set of ON pixels wherein any two pixels in the set can be joined by a path that includes the two pixels and includes only pixels in the set, and each pixel on the path is laterally, vertically, or diagonally adjacent to at least one other pixel on the path. An ON pixel that has no 8-connected neighbors may as a matter of definition be considered an 8-connected region.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid $2 \times 2$ SE is a $2 \times 2$ square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Generalized opening" is a morphological operation that consists of an erosion (using the hits and misses in the SE) followed by a dilation (using only the hits in the SE).

"Closing" is a morphological operation consisting of a dilation followed by an erosion.

For opening, generalized opening, and closing, the result does not depend on the center location of the SE since each operation includes successive complementary operations with the same SE.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

System Overview

FIG. 1 is a block diagram of a computer system 10 within which the present invention may be embodied. The computer system configuration illustrated at this high level is standard, and as such, FIG. 1 is labeled prior art. A computer system such as system 10, suitably programmed to embody the present invention, however, is not. In accordance with known practice, the computer system includes a processor 12 that communicates with a number of peripheral devices via a bus subsystem 15. These peripheral devices typically include a memory 17, a keyboard or other input device 20, a display 22, a file storage system 25 such as one or more hard disk drives and floppy disk drives, a printer 27, an optional scanner 30, and a fax modem 32. Fax modem 32 is shown as being in intermittent communication with a fax machine 35, normally considered to be at a remote location, via a telephone line 37 (shown in phantom). It will be appreciated that computer system 10 includes all the elements of a fax machine, and references to a fax machine are generally meant to include such a computer system as well as a self-contained fax machine.

The present invention relates to image analysis, and according to the invention, processor 12, suitably programmed, operates to extract and analyze features in a binary input image. In a typical case, the input image originates from a paper document 40 that was scanned into scanner 30 or that was scanned into fax machine 35 and communicated to fax modem 32 over phone line 37. In a case where fax machine 35 is a computer with a fax modem, the input image could also have been generated on that computer and faxed to fax modem 32.

The encoding of an input bitmap, the transmission of the encoded file to another fax machine, and the decoding into an output bitmap occur according to a standard facsimile protocol, such as the CCITT group 3 or group 4 encoding formats. From the point of view of the present invention, what is referred to above as the output bitmap is considered the binary input image.

Image Reduction and Representative Convolution Windows

The present invention provides a method for reducing a binary input image by a vertical factor of M and a horizontal factor of N in a manner that preserves or eliminates certain characteristic textures and features. The image is divided into tiles that are M×N pixels (i.e., each tile has M pixels down and N pixels across) and each tile is mapped to a single corresponding pixel in a reduced image. Typically M=N. For each tile, a convolution window is applied, and the ON pixels in the tile at the active pixel positions are tested to determine whether a particular condition is met. The corresponding pixel in the reduced image is turned ON if and only if the condition is met.

In this context, the term "convolution window" refers to a set of W active pixel positions relative to a reference pixel position. This is somewhat analogous to a structuring element (SE) as is used for morphological operations in that the window's reference position is aligned with a given pixel in the source image, as is done with an SE. The operation is different, however, since it entails determining the values of the pixels in the source image that lie at the positions defined by the convolution window, and performing a threshold operation to determine the value that the pixel in the destination shall take. The operation according to the present invention further differs from morphological operations in that the source image is tiled, and only one evaluation is made for each tile.

The condition that is often tested for is that at least a predetermined number of subconditions are met. Each subcondition has an associated threshold and subset of the active pixel positions and requires that at least the associated threshold number of pixels in the associated subset are ON. The subsets need not be disjoint and one of subsets may be the whole set. Typically, the predetermined subsets are just the individual active pixel positions, and the threshold condition is that least a threshold number T of the pixels at those positions are ON.

FIGS. 2A–2F illustrate the subsampling tiles and convolution windows for various embodiments of the invention. The convolution window typically contains far fewer pixel positions than are present in the tile. The specific embodiments use 16×16 tiles for subsampling, and have the tiles and the window's reference pixel aligned with 16-bit word boundaries in the computer. For consistency of nomenclature, the window reference pixel is the upper left pixel in the tile. By definition, the window need not include this position. For the cases described here, the window is no larger than the tile in any dimension, but this is not a fundamental constraint.

Figure 2A:
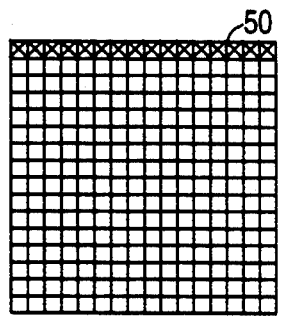
FIGS. 2A–2F show representative convolution windows for use with the present invention.
Figure 2B:
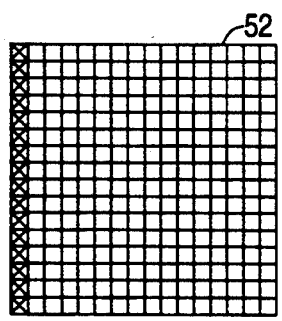

FIG. 2A shows the case with a window 50 that is a 1×16 horizontal window (1 bit high, 16 bits wide) located in the top row of the tile. A threshold convolution with T=1 can be done on the 16-bit word in the tile by evaluating the word (zero/non-zero). FIG. 2B shows the case with a window 52 that is a 16×1 vertical window (16 bits high, 1 bit wide) located in the leftmost column of the tile. For the vertical window, a threshold convolution with T=1 can be done by ORing the 16 appropriately masked words. This is about 16 times more expensive than for the horizontal window.

Figure 2C:
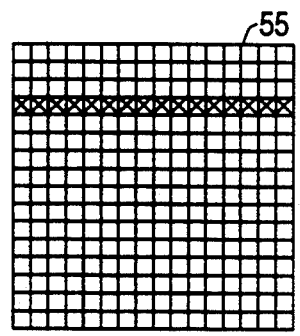
Figure 2D:
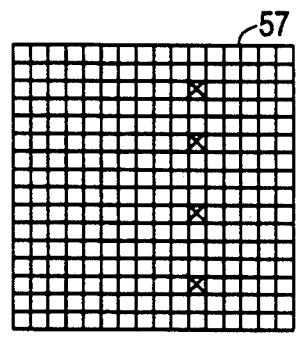
Figure 2E:
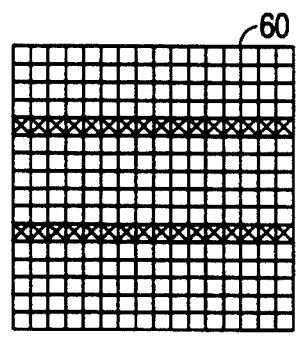
Figure 2F:
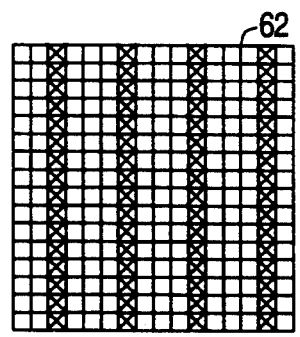

FIGS. 2C–2F show a number of variations and generalizations. FIG. 2C shows a horizontal window 55 where a row other than the top one is used. Similarly a column other than the leftmost one could be used. FIG. 2D shows a vertical window 57 that includes only some of the column bits (i.e., the pixel positions are not contiguous). Similarly, a horizontal window could include only some of the row bits. A threshold convolution for T=1 and a horizontal window with non-contiguous positions would require masking the word and evaluating the masked word (zero/non-zero) or inspecting each of the pixel positions. A threshold convolution for T=W would require masking the word and either XORing the masked word with the mask or comparing the masked word with the binary value that corresponds to the mask. FIGS. 2E and 2F show the generalization where the window covers a plurality of rows (window 60 in FIG. 2E) or columns (window 62 in FIG. 2F). It so happens that a number of the simplest cases have particular utility in extracting certain features and textures in documents, as will now be described.

Case 1. The 1×16 horizontal window of FIG. 2A for T=1 is extremely fast. T=1 corresponds to ORing the pixels in the row, but the same result is achieved by testing the first word in the tile. The reduced pixel value is ON if the word is zero, OFF if it is non-zero. This case performs the following texture mapping: (1) solidifies textlines for N=16 or greater and therefore makes nice "thumbnail" images; (2) solidifies halftones for N=8 or greater; (3) sometimes misses horizontal rules, especially for N=16 or greater; and (4) preserves vertical rules in all cases.

To separate text from halftones or vertical rules, an opening with a vertical SE removes textlines but preserves halftones and vertical rules. Alternatively, an opening with a vertical SE consisting of a MISS, HIT, and MISS, where the MISSes are separated vertically by an amount larger than the textline height, will remove everything but the textlines.

Case 2. The 1×16 horizontal window of FIG. 2A for T=16 is also extremely fast. T=6 corresponds to ANDing the pixels in the row, but the same result is achieved by testing the first word in the tile. The reduced pixel value is ON if the word is all 1's (FFFF), OFF if it is any other value. This case reliably projects out regions of solid ON pixels that are of height greater than M and width greater than 2N. Thus, it can be used to distinguish solid areas from halftones.

Case 3. The 16×1 vertical window of FIG. 2B for T=1 is slower than the two cases of the 1×16 horizontal window by about a factor of M. The reduced binary pixel value corresponding to each tile is found by ORing the first pixel in each of the M words in the tile: if the result is 0, the resulting binary pixel is OFF; else, the pixel is ON. This case reliably projects out halftones, textlines, and horizontal rules; it often misses thin vertical rules. For M=N=8, the words in a textline are typically separated. Thus, the texture of the resulting textline and horizontal rule regions are quite different: the horizontal rule is horizontally continuous, where the textline is broken by word boundaries. As with the first case, halftone and textline regions are easily differentiated by the line texture in the textlines (vs. solid regions in halftones).

Suppose it is desired to implement a fast operation that answers the question whether or not there are any halftone regions. Case 1 can be used to get a first reduced image that preserves halftones and large solid regions. Case 2 can then be used to get a second reduced image that generally preserves the solid regions. The second reduced image is dilated with a small SE, and subtracted from the first reduced image. Anything left over is halftones.

Sample Applications

Figure 3:
FIG. 3 shows a representative image.

There are obviously many other cases. For concreteness, a few image segmentation and feature extraction applications that use only the simple and efficient cases described above will be described. The image shown (slightly reduced) in FIG. 3 includes halftones, text, vertical rules, and horizontal rules. The procedures described below show how the reduction technique of the present invention operates to extract the various features rapidly and accurately.

Figure 4A:
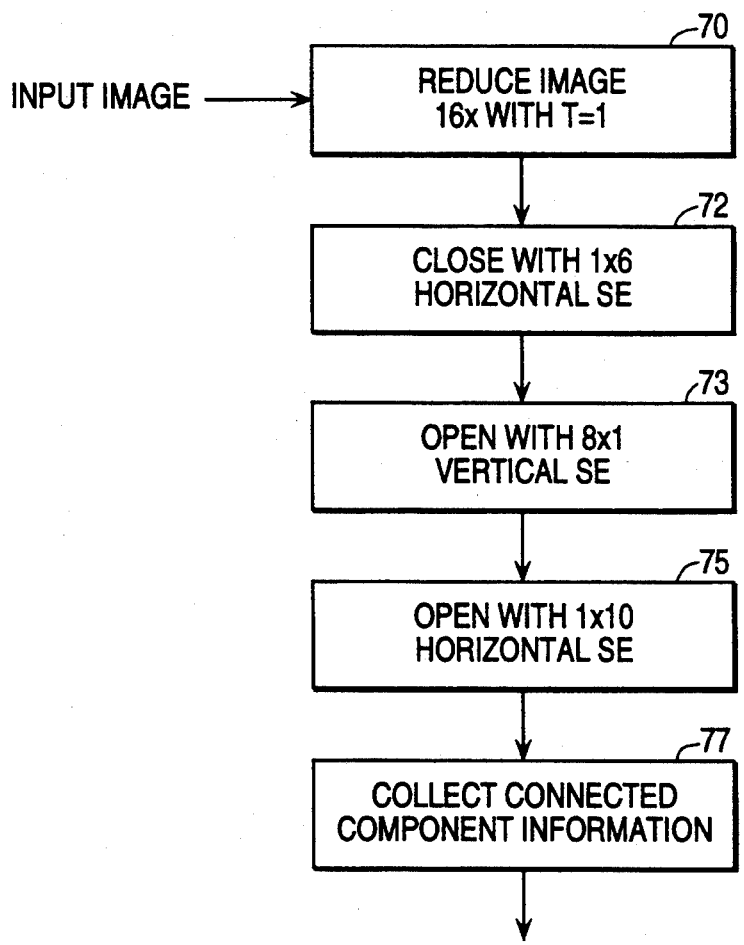
FIG. 4A is a flow diagram showing a method for extracting halftone regions from the image.

FIG. 4A is a flow diagram showing a technique for the detection and location of halftone regions. FIGS. 4B-4E show the results after the various operations. The image is first subjected to a 16× horizontally prefiltered textured reduction (step 70, see FIG. 4B), using T=1 and the simple window shown in FIG. 2A. Note that the textline texture is preserved well. This operation itself is quite useful for making "thumbnail" images, because the result looks much more like text lines than would the result of a straight subsampling operation. The image is then closed (step 72, see FIG. 4C) with a small (say 1×6) horizontal SE to consolidate the image and text parts. The image is then opened (step 73, see FIG. 4D) with an 8×1 vertical SE to remove the textline regions. The image is then opened (step 75, see FIG. 4E) with a 1×10 horizontal SE to remove noise and vertical rules. Any remaining pixels were from (halftone) image regions. If the resulting image is non-zero, there were halftones. If it is desired to know approximately where they were, a bounding box computation (step 77), either morphological or via connected components, gives a quick answer.

Figure 5A:
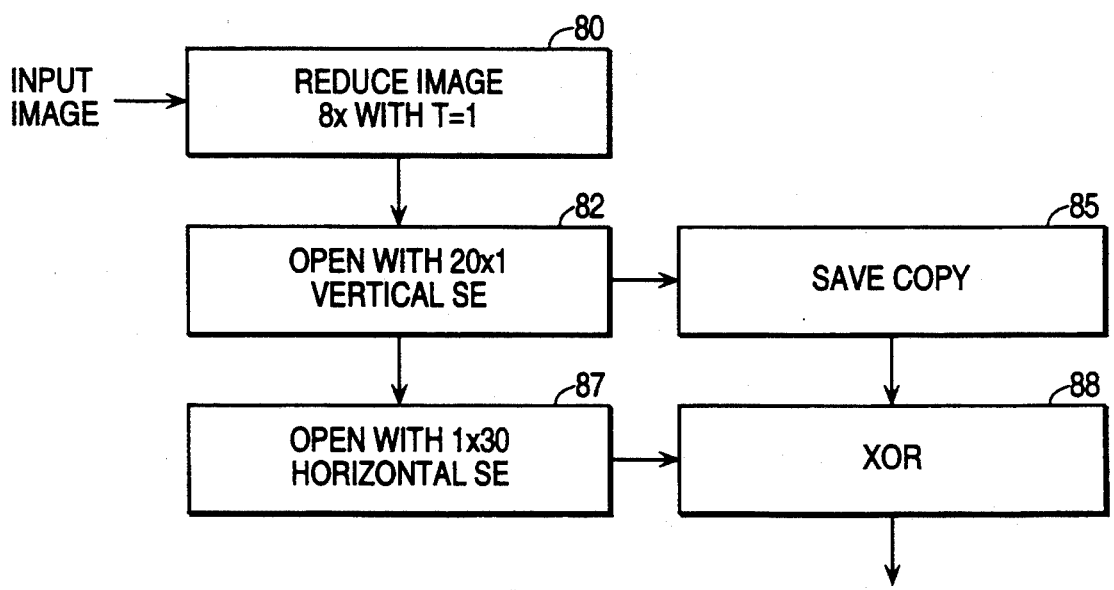
FIG. 5A is a flow diagram showing a method for extracting vertical rules from the image.
Figure 4B:
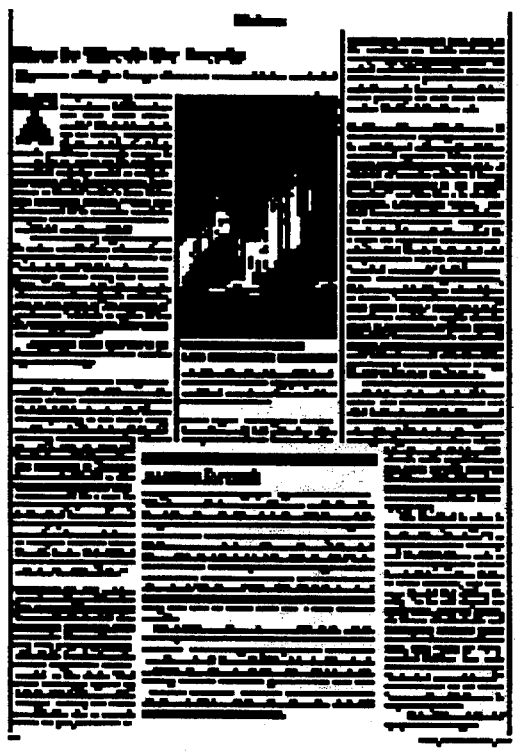
FIGS. 4B–4E show the image at various stages of the method.
Figure 4C:
Figure 4D:
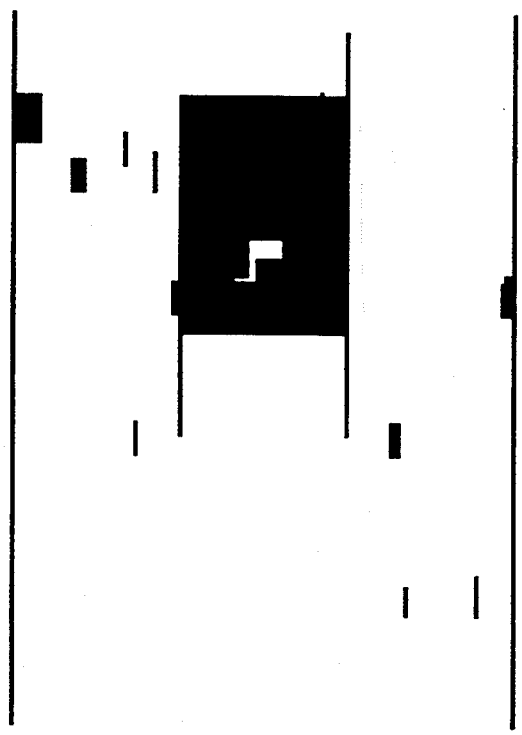
Figure 4E:
Figure 5B:
FIGS. 5B and 5C show the image at various stages of the method.
Figure 5C:
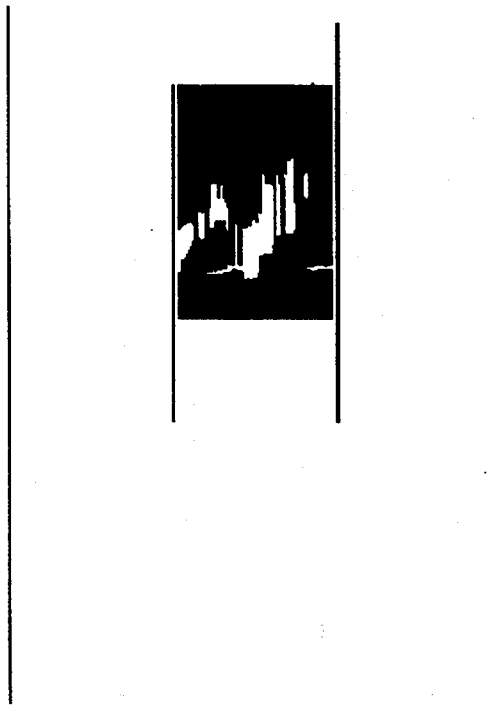

FIG. 5A is a flow diagram showing a technique for the extraction of vertical rules. FIGS. 5B and 5C show the results after the various operations. The image is first reduced (step 80) as above except that an 8× horizontally prefiltered textured reduction is used. As can be seen in FIG. 5B, some of the horizontal rules are missed by this operation. The remaining horizontal rules are removed by opening (step 82) the image with a 20×1 vertical SE. The result, shown in FIG. 5C, has both the vertical rules and the halftone regions. To get the vertical rules alone, it is a simple matter to make an extra copy of the resulting image (step 85), open (step 87) one of the copies of the image with a horizontal SE (say 1×30) to remove them, and XOR (step 88) the result back with the reserved copy.

Figure 6A:
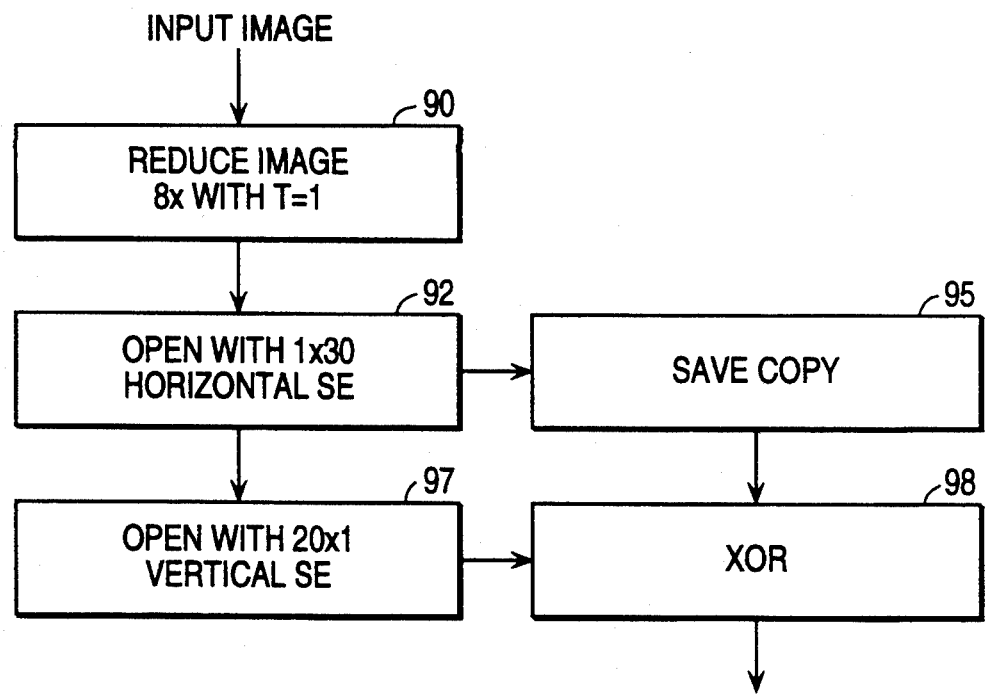
FIG. 6A is a flow diagram showing a method for extracting horizontal rules from the image.
Figure 6B:
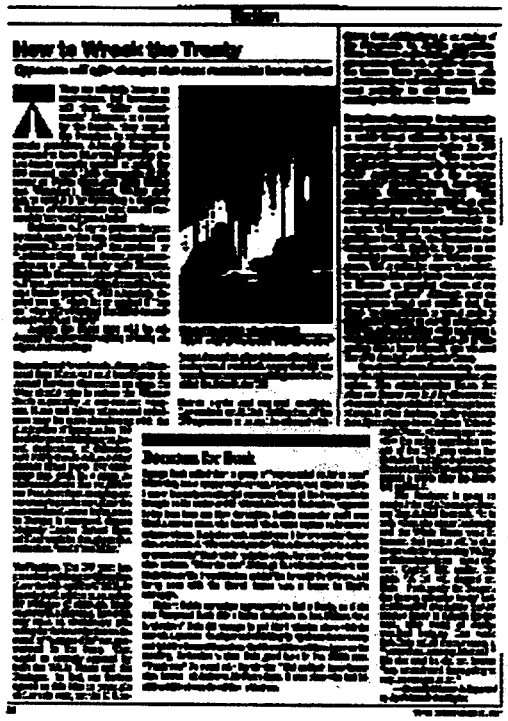
FIGS. 6B and 6C show the image at various stages of the method.
Figure 6C:
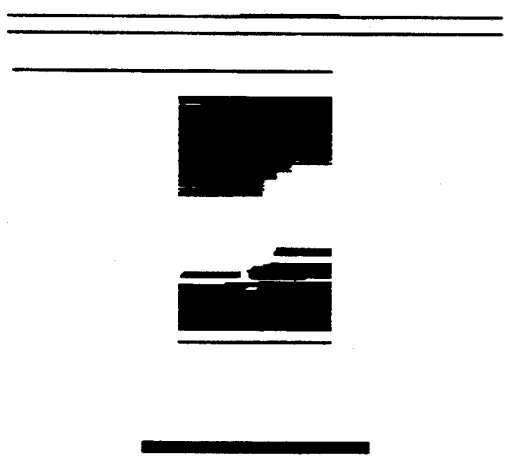

FIG. 6A is a flow diagram showing a technique for the extraction of horizontal rules. FIGS. 6B and 6C show the results after the various operations. The image is first subjected to a vertically prefiltered textured reduction with T=1 (step 90) using the window of FIG. 2B. As can be seen in FIG. 6B, some of the vertical rules have already been eliminated by this operation. The remaining vertical rules are removed by opening (step 92) the image with a horizontal 1×30 horizontal SE. The result, shown in FIG. 6C has both the horizontal rules and the halftone regions. As before, to get only the horizontal rules, it is a simple matter to make an extra copy of the resulting image (step 95), open (step 97) one of the copies of the image with a vertical SE (say 20×1) to remove them, and XOR (step 98) the result back with the reserved copy.

Figure 7A:
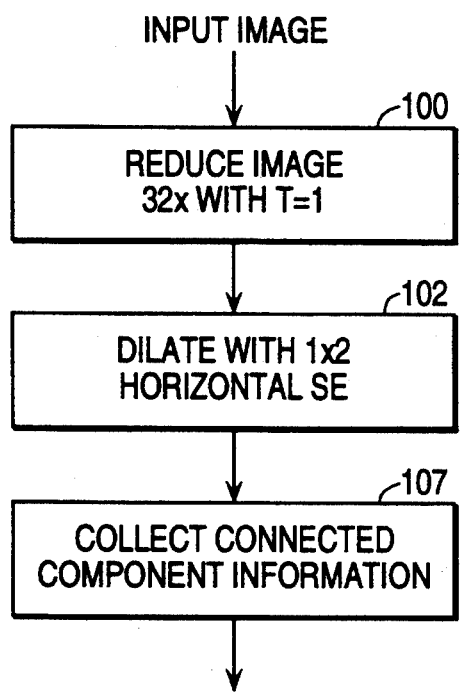
FIG. 7A is a flow diagram showing a method for determining if a large mark exists in a scanned image.
Figure 7A:
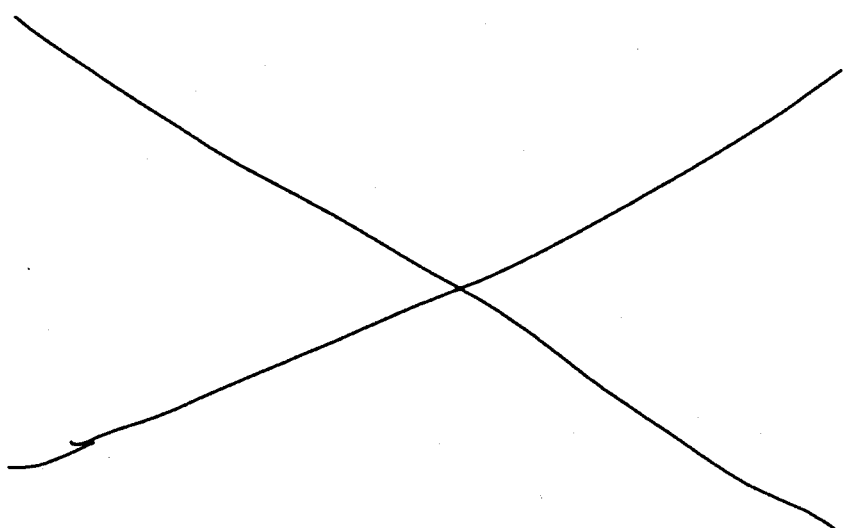
Figure 7B:
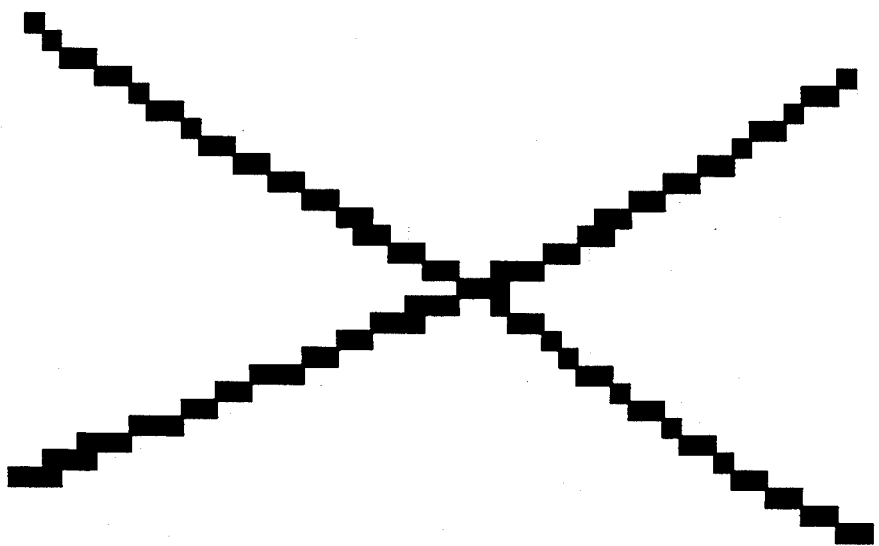
Figure 7C:
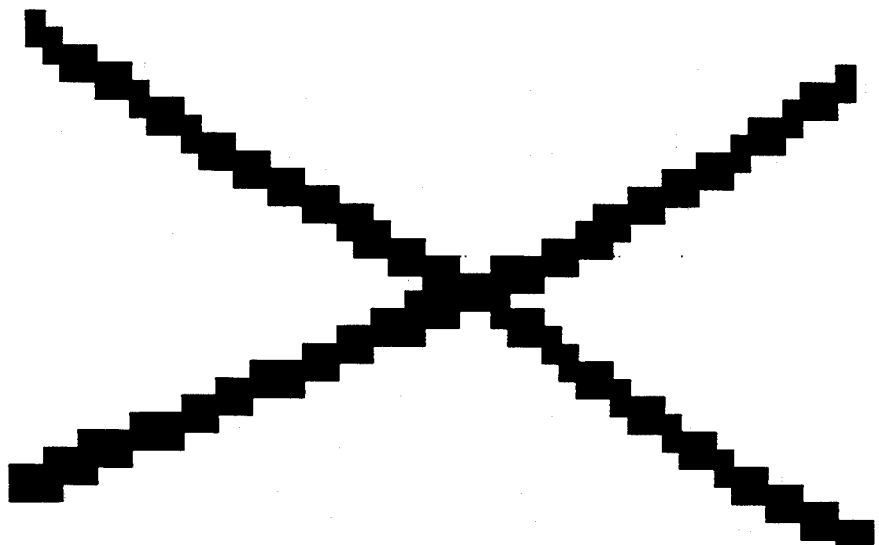

FIG. 7A is a flow diagram showing a technique for the detection and location of large marks. There are several situations were it may be desired to determine very quickly if a large mark exists. One specialized application is where a blank page with a handwritten large mark (a slash or a large X) is faxed to or scanned into the computer to indicate that a certain action is to be taken. FIG. 7B shows a scanned image that originated as a blank page with a large X drawn on it. The image is first subjected to a 32× horizontally prefiltered textured reduction (step 100, see FIG. 7C), using T=1 and a 32-bit version of the simple window shown in FIG. 2A. FIG. 7C shows the pixels in the reduced image, magnified 32× for visibility. As can be seen from FIG. 7C, the ON pixels provide a fairly faithful representation of the original mark. The mark shows as a single large 8-connected component, with a number of relatively small regions being 4-connected. While there are techniques for computing the size and position of 8-connected components, for ease of implementation, it is preferred to perform the analysis in terms of a 4-connected component. The image is then dilated (step 102, see FIG. 7D) with a 1×2 horizontal SE, which converts the mark to a single 4-connected component. The size and location of this component can be determined by a bounding box computation. While the technique for doing this is not part of the invention, a preferred procedure will be briefly summarized.

A copy of the reduced image is scanned by the computer (i.e., each pixel is evaluated), starting at the upper left and proceeding from left to right and top to bottom until an ON pixel is found. The coordinates of that pixel are saved, and initially represent the current best information regarding the corners of the bounding box of the connected component to which the found pixel belongs (the bounding box is fully specified by its upper left and lower right corners). The found pixel and all its 4-connected neighbors are turned OFF. As each pixel is turned OFF, its coordinates are compared with the current corner coordinates. If either coordinate is outside the range of the current bounding box, the appropriate corner coordinate(s) are updated to enlarge the now-current bounding box. The technique for finding and turning off the 4-connected neighbors is described in Paul S. Heckbert, "A Seed Fill Algorithm, "pages 275–277 and 721–722 of "Graphics Gems," edited by Andrew S. Glassner (Academic Press, Inc. 1990). Once a connected component has been erased and its bounding box coordinates saved, the scan begins again, starting immediately past the position where the first pixel in the just-erased component was found. If another ON pixel is found, the sequence is repeated. Once the resumed scan fails to find an ON pixel, the procedure is complete, and the relevant bounding box information can be extracted.

Discussion of the Software

A current embodiment of the invention is implemented in software on a personal computer. Source code in the C language for performing the various types of morphological operations on a Sun Workstation is disclosed in U.S. Pat. No. 5,065,437, titled "IDENTIFICATION AND SEGMENTATION OF FINELY TEXTURED AND SOLID REGIONS OF BINARY IMAGES," the disclosure of which is incorporated by reference.

Conclusion

In summary it can be seen that the present invention provides a fast and effective technique for reducing images and extracting useful information.

While the above is a complete description of the preferred embodiments of the present invention, various modifications, alternative constructions, and equivalents can be used. For example, it is possible to select the bits for logical operations to be subsets in both horizontal and vertical directions, use a mask that selects a subset of the row bits for the horizontal window, and apply a logical operation between two or more rows that have been masked.

The particular examples described above were all separable operations in the sense that the same mask is used for each row and the same logical operations are performed between bits for each row. The operations can be generalized further to cases that are not separable (e.g., where a different mask is used on each row) or that have a window size that is smaller or larger than the subsampling tile.

Therefore, the above description and illustration should not be taken as limiting the scope of the invention which is defined by the claims.

What is claimed is:
1. A processor-based method for reducing a binary input image to produce a reduced image wherein the input image is divided into M×N tiles, each tile has M pixels down and N pixels across, and each tile is mapped to a single pixel in the reduced image, comprising the steps, carried out once for each tile, of:
 applying a convolution window defined by a plurality of active pixel positions when registered to the tile, the number of active pixel positions in the tile being less than the number of pixels in the tile;
 determining, on the basis of pixel values at the active pixel positions, whether a particular condition is met; and
 turning ON the pixel in the reduced image if and only if the result of said determining step is affirmative.
2. The method of claim 1 wherein the convolution window fits entirely within the tile.
3. The method of claim 1 wherein the convolution window is a horizontal 1×N window.
4. The method of claim 1 wherein the convolution window is a vertical N×1 window.
5. The method of claim 1 wherein the convolution window is a horizontal 1×N window.
6. The method of claim 1 wherein:
 the particular condition is that there be at least a threshold number T of ON pixels at the active pixel positions;
 the convolution window fits entirely within the tile; and
 the convolution window is a horizontal 1×N window.
7. The method of claim 1 wherein:
 the particular condition is that there be at least a threshold number T of ON pixels at the active pixel positions;
 the convolution window fits entirely within the tile; and
 the convolution window is a vertical M×1 window.
8. The method of claim 1 wherein:
 the processor-based method is performed in a computer capable of testing whether a word has a value of 0;
 the convolution window is a horizontal 1×N window entirely within the tile and corresponds to a word in the computer;
 the particular condition is that there be at least 1 ON pixel at the active pixel positions; and
 said determining step is carried out by testing whether the word has a value of 0.
9. The method of claim 1 wherein:
 the processor-based method is performed in a computer capable of testing whether a word has a value of $2^N-1$;
 the convolution window is a horizontal 1×N window entirely within the tile and corresponds to a word in the computer;
 the particular condition is that there be N ON pixels at the active pixel positions; and
 said determining step is carried out by testing whether the word has a value of $2^N-1$.
10. A processor-based method for reducing a binary input image to produce a reduced image wherein the input image is divided into M×N tiles, each tile has M pixels down and N pixels across, and each tile is mapped to a single pixel in the reduced image, comprising the steps, carried out once for each tile, of:

applying a convolution window defined by a plurality of active pixel positions when registered to the tile, the number of active pixel positions in the tile being less than the number of pixels in the tile;

determining, on the basis of pixel values at the active pixel positions, whether at least a predetermined number of subconditions are met, each subcondition having an associated threshold and an associated subset of the active pixel positions, each subcondition requiring that at least the associated threshold number of pixels at the active pixel positions in the associated subset be ON; and turning ON the pixel in the reduced image if and only if the result of said determining step is affirmative.

11. The method of claim 10 wherein the predetermined number is 1 and the predetermined subsets are each defined by a different single pixel position.

12. The method of claim 10 wherein the convolution window fits entirely within the tile.

13. The method of claim 10 wherein the convolution window is a vertical $M \times 1$ window.

14. The method of claim 10 wherein:
the convolution window includes first and second horizontal $1 \times N$ windows; and
the subconditions are that at least a threshold number of pixels at the active pixel position in each of the first and second horizontal $1 \times N$ windows be ON.

15. A processor-based method for reducing a binary input image to produce a reduced image wherein the image is divided into $M \times N$ tiles, each tile has M pixels down and N pixels across, and each tile is mapped to a single pixel in the reduced image, comprising the steps, carried out once for each tile, of:

evaluating a particular plurality of the pixels in the tile, the particular plurality being smaller in number than the number of pixels in the tile;

determining whether at least a threshold number of the evaluated pixels are ON; and turning ON the pixel in the reduced image if and only if the result of said determining step is affirmative.

16. The method of claim 15 wherein the particular plurality of pixels is a horizontal $1 \times N$ array in the tile.

17. The method of claim 15 wherein the particular plurality of pixels is a vertical $M \times 1$ array in the tile.

18. The method of claim 15 wherein:
the processor-based method is performed in a computer capable of testing whether a word has a value of 0;
the particular plurality of pixels is a horizontal $1 \times N$ array in the tile and corresponds to a word in the computer;
the threshold number is 1; and
said evaluating and determining steps are carried out by testing whether the word has a value of 0.

19. The method of claim 15 wherein:
the processor-based method is performed in a computer capable of testing whether a word has a value of $2^N - 1$;
the particular plurality of pixels is a horizontal $1 \times N$ array in the tile and corresponds to a word in the computer;
the threshold number is N; and
said evaluating and determining steps are carried out by testing whether the word has a value of $2^N - 1$.

* * * * *